US008664530B2

(12) United States Patent
Ross et al.

(10) Patent No.: US 8,664,530 B2

(45) Date of Patent: Mar. 4, 2014

(54) PRESS-FIT BUSBAR AND BUSWAY EMPLOYING SAME

(75) Inventors: Steven L. Ross, Pittsburgh, PA (US); Russell C. Griffith, Freedom, PA (US)

(73) Assignee: Universal Electric Corporation, Canonsburg, PA (US)

( * ) Notice: Subject to any disclaimer, the term of this patent is extended or adjusted under 35 U.S.C. 154(b) by 71 days.

(21) Appl. No.: 13/091,248

(22) Filed: Apr. 21, 2011

(65) Prior Publication Data

US 2011/0261508 A1 Oct. 27, 2011

Related U.S. Application Data

(60) Provisional application No. 61/326,878, filed on Apr. 22, 2010.

(51) Int. Cl.
*H02G 5/00* (2006.01)

(52) U.S. Cl.
USPC ..... 174/99 B; 174/70 B; 174/72 B; 174/88 B; 174/133 B; 439/115

(58) Field of Classification Search
USPC .... 174/70 B, 72 B, 88 B, 99 B; 439/115, 212
See application file for complete search history.

(56) References Cited

U.S. PATENT DOCUMENTS

| | | | | | |
|---|---|---|---|---|---|
| 3,213,326 | A * | 10/1965 | Gryetko | ........................ | 361/673 |
| 4,134,633 | A * | 1/1979 | Krause et al. | ................. | 439/110 |
| 4,867,713 | A | 9/1989 | Ozu et al. | | |
| 5,431,576 | A | 7/1995 | Matthews | | |
| 5,895,279 | A * | 4/1999 | Petrisko et al. | ............... | 439/114 |
| 6,039,584 | A * | 3/2000 | Ross | ............................ | 439/115 |
| 6,296,498 | B1 | 10/2001 | Ross | | |
| 7,468,488 | B1 * | 12/2008 | Hilgert | ............................ | 174/95 |
| 2009/0047814 | A1 | 2/2009 | Daamen | | |

OTHER PUBLICATIONS

Korean Intellectual Property Office, "International Search Report and Written Opinion", Dec. 23, 2011, 9 pp.

The International Bureau of WIPO, "International Preliminary Report on Patentability", Nov. 1, 2012, 6 pp.

* cited by examiner

*Primary Examiner* — Dhirubhai R Patel

(74) *Attorney, Agent, or Firm* — Eckert Seamans Cherin & Mellott, LLC; Stephen A. Bucchianeri

(57) ABSTRACT

An improved conductive busbar assembly and power distribution track utilizing the improved conductive busbar assembly. The busbar assembly including an inner component adapted to engage a stab member of a plug-in unit and an outer component disposed about, and in contact with, the inner component. The inner and outer components are both formed from an electrically conductive material. The busbar assembly provides greater current-carrying capacity and permits take-off devices to be installed at any point along the busway run. (continuous access)

20 Claims, 11 Drawing Sheets

PRESS-FIT BUSBAR AND BUSWAY EMPLOYING SAME

CLAIM TO PRIORITY

This application claims priority to U.S. provisional application No. 61/326,878 filed Apr. 22, 2010, entitled "Improved Press-Fit Busbar and Busway Employing Same", the contents of which are incorporated herein by reference.

BACKGROUND

1. Field of the Invention

The present invention relates to an electrical distribution track in which multiple electrically-isolated, conductive busbars are housed in an elongated enclosure for feeding higher-current electricity to take-off devices that may be inserted into the track at any point along the length of the track to make electrical contact with the busbars.

2. Background Information

It is common in factories, shops, offices and other buildings to install overhead electrical power distribution tracks for providing a convenient source of electricity for lights, machines and other electrical devices in the buildings.

Electrical power distribution tracks are typically comprised of an elongated housing containing multiple electrically-isolated, conductive busbars. Track lighting and continuous plug-in busway are typical of this type of track system. Sections of the track can be joined together to form long runs for power distribution. Take-off devices are used to tap power from the track or busway to the load apparatus. The load may be anything from a lamp to a three phase electrical machine. It is desirable to be able to insert take-off devices into, or remove them from, the track at any point along the track itself and make a secure electrical contact with the busbars.

It is also desirable that the electrical connection between take-off devices and the busbar not require bolts, crimps or other fastening hardware. A pressure connection is easily made or removed and is therefore the method of choice for most busbars to take-off device connections. However, as the ampere rating of the take-off device increases, it is necessary to increase both the contact area and pressure of the connection. Conventional systems are typically limited primarily in the contact area of the connection.

Examples of such systems may be found in U.S. Pat. No. 3,801,951, issued to Kemmerer, U.S. Pat. No. 5,619,014, issued to Seimens, or U.S. Pat. No. 6,352,450, issued to Bronk.

Commonly-assigned U.S. Pat. No. 6,039,584, issued to Ross, describes an electrical power distribution busbar, as shown in cross-section in FIGS. 1*a* and 1*b*, which employs a longitudinal, flexible, conductive member which is made of a material such as copper in order to fulfill at once the requirements of conductivity and flexibility. The flexible conductive system is captured in a busbar which carries the electrical current of the system. The current-carrying capacity is limited to the thickness of the copper which is relatively expensive compared to other conductive materials such as aluminum. Furthermore, the shape cannot be applied to larger size busbars because of cost (and reduction of flexibility) or flexible conductive systems made of aluminum because of bend radius.

For example, U.S. Pat. No. 7,374,444 issued to Bennett, teaches the use of aluminum, but the geometry is not designed to accommodate take-off devices to be installed at any point along the busway run (continuous access). Other prior art includes Multilam™, made by Multi-contact USA, as illustrated in U.S. Pat. Nos. 4,191,445 or 7,101,203 or international publication WO/2009/112762. Multilam™ bands are torsion or leaf spring contact elements. The Multilam™ design produces a large number of louvers, and therefore allows contact to be made through many defined contact points and thus is limited in its current-carrying capacity owing to fringing and other adverse effects local to the points of contact.

The prior art fails to provide a higher current-capacity busbar system which is inexpensive, robust and simple to manufacture. Thus there is still room for further improvement.

SUMMARY OF THE INVENTION

The present invention solves the problems described above and satisfies the need for an increased current-capacity compression busbar that provides contact pressure by means of a flexible conductive system. The invention provides an improved electrical power distribution system that permits continuous access for inserting take-off devices and also has high current capacity. The invention provides enhanced electrical contact between the busbars and the stabs on take-off devices. It provides firm contact pressure and large contact surface area and allows a take-off device to be inserted at any point along the track. It further provides improvements in manufacturability of a higher-current carrying busbar by virtue of an inventive construction.

The present invention describes a busbar with socket/casing which is an improvement over that described in commonly-assigned U.S. Pat. No. 6,039,584, issued to Ross (hereinafter "Ross '584") the contents of which are incorporated herein by reference. The Ross '584 patent describes an electrical power distribution system that requires a longitudinal, flexible, conductive busbar member which must be made of a relatively expensive material such as copper. The current-carrying capacity of such design is limited to the thickness of the copper and therefore to the shape, flexibility and size limitations inherent to copper of that thickness.

The present invention utilizes a flexible conductive system captured into a compound casing/strip busbar which carries the electrical current of the system. As in the case of Ross '584, the present invention further provides a unique retainer that fits in a slot in the insulating support in the channel enclosure on at least one and preferably both ends of each busbar. The retainers are secured to the insulating support and thereby fix or retain the busbar in the slot in the support. As in the case of Ross '584, this invention includes a busbar having a generally U-shaped profile in cross-section with resilient substantially parallel re-entrant flanges.

In addition to the fundamental improvements of the present invention as disclosed herein, the foregoing elements (busbar, enclosure, longitudinal and secondary channels) may differ from Ross '584 in certain aspects according to the detailed description below. Other elements pictured may also be different. Other differences and inventive improvements will be apparent to those skilled in the art.

The improved quality product of the present invention, as described below, is achieved by replacing the copper busbar element of the prior art, which hitherto supplied both structural and conduction function, with a compound assembly. In the compound assembly the casing, which serves both a conductive and structural role, is made of extruded aluminum, copper or other suitable material and only the conductive strip insert is required to be made of copper or other suitable material. The solid busbar socket/casing of the present invention must be specially shaped to receive the flexible strips but can be of any size and constructed out of copper or aluminum, although aluminum is preferable in most cases where cost is a factor.

In accordance with an aspect of the invention, an electrical power distribution track is provided. The electrical power distribution track includes a housing and a number of busbar assemblies disposed in the housing. Each busbar assembly includes an inner component adapted to engage a stab member of a plug-in unit and an outer component disposed about, and in contact with, the inner component. Both the inner and outer components are formed from an electrically conductive material.

In accordance with another aspect of the invention, a busbar assembly is provided. The busbar assembly including an inner component adapted to engage a stab member of a plug-in unit and an outer component disposed about, and in contact with, the inner component. The inner and outer components are both formed from an electrically conductive material.

The inner component may be captive within the outer component.

The inner component may comprise a flexible material and the outer component may comprise a rigid material.

The inner component may be formed from a copper material and the outer component may be formed from an aluminum material.

The outer component may be formed from a copper material.

The inner component may be formed from a copper strip having a thickness in the range of about 0.010 to about 0.125 inches thick.

The inner component may be formed from a copper strip having a thickness in the range of about 0.030 to about 0.050 inches thick.

The inner component may include generally parallel portions adapted to engage the stab member of a plug-in unit.

The inner component may be formed such that the generally parallel portions are biased toward each other when engaging the stab member of a plug-in unit.

One of the inner and outer components may be plated with a plating comprising one of tin, nickel or silver.

DETAILED DESCRIPTION OF EMBODIMENTS OF THE INVENTION

Figure 1A:
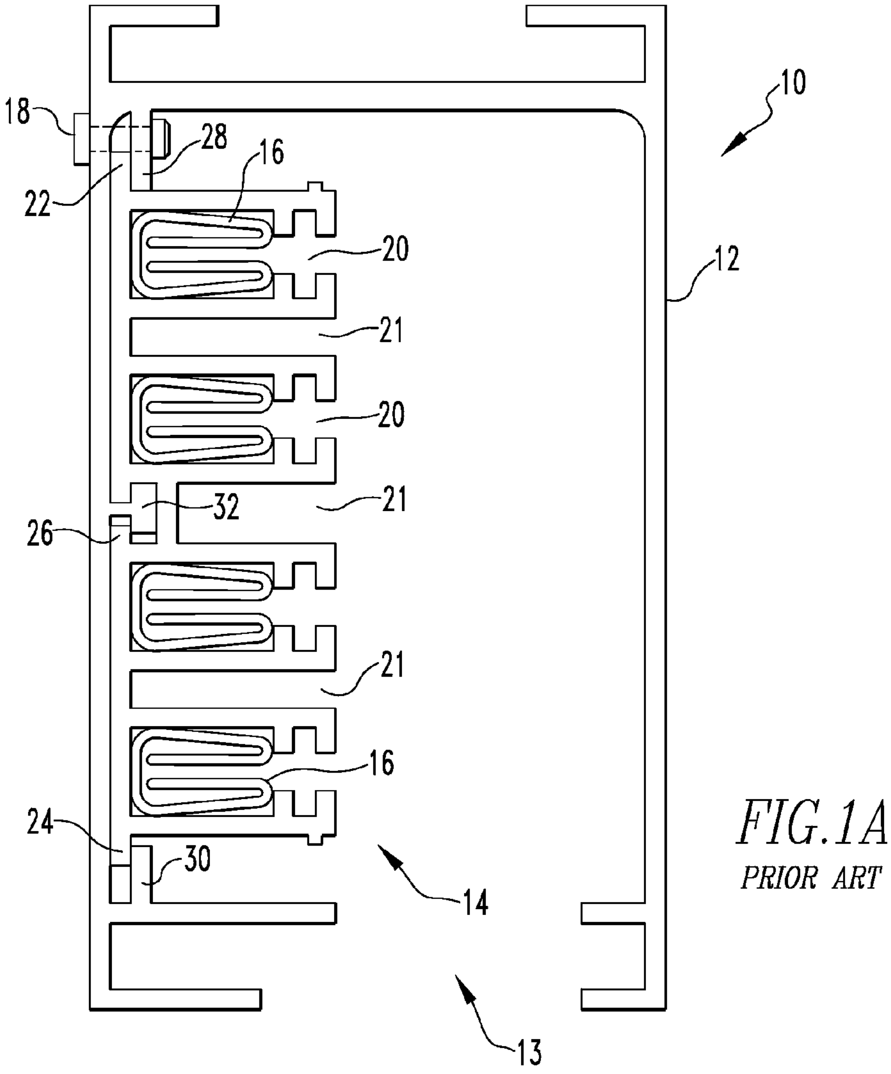
FIG.1A PRIOR ART
FIG. 1*a* is a cross-sectional view of a prior art electrical power distribution track.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As employed herein, the term "number" shall be used to refer to any non-zero quantity (i.e. one or any quantity greater than one).

As employed herein, the statement that two or more parts are "coupled" together shall mean that the parts are joined together either directly or joined through one or more intermediate parts.

The present invention is directed to an improved electrical power distribution system that provides continuous access for inserting take-off devices and also high current capacity. The invention provides enhanced electrical contact between the busbars and the stabs on take-off devices. The invention provides firm contact pressure as well as a large contact surface area while allowing for a take-off device to be inserted at almost any point along the track. A unique retainer fits in a slot in the insulating support in the channel enclosure at each end of each busbar. The retainers are secured to the insulating support and thereby retain the busbar within the slot in the support.

FIG. 1*a* shows a cross-sectional view of a known electrical power distribution track 10, such as described in commonly-assigned U.S. Pat. No. 6,039,584 to Ross (hereinafter "Ross '584"). A typical busway run may include several track sections 10 which are joined end-to-end to make the power distribution system. Each track section 10 may generally be up to 20 feet in length and any number of sections may be joined together to form long runs of busway for power distribution. Power take-off devices can be installed at any point along the busway except at the coupling between adjacent sections of the track.

Continuing to refer to FIG. 1*a*, each section of the track 10 includes an enclosure 12 which is preferably a channel-shaped aluminum extrusion as is disclosed in Ross '584, although it is to be appreciated that enclosure 12 may vary in external dimensions and proportions according to the number of busbars housed therein (typically between 3 and 10 depending on the application and enclosure size selected). The enclosure 12 may be attached to a ceiling, wall or the like and is typically disposed with the mouth or access slot 13 to the channel open downwardly, such as shown in FIG. 1*a.*

Figure 1B:
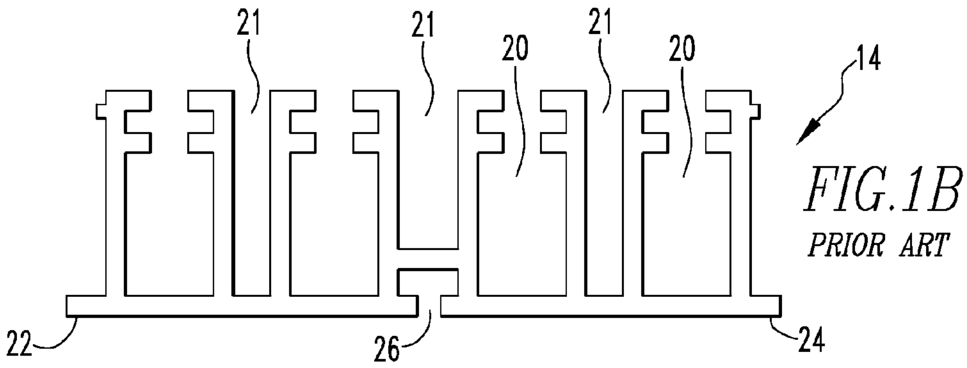
FIG.1B PRIOR ART
FIG. 1*b* is a cross-sectional view of a portion of the prior art electrical power distribution track of FIG. 1*a*.

The track 10 further includes a support 14, shown individually in cross-section in FIG. 1*b*, secured in the enclosure and a plurality of electrically conductive busbars 16 (FIG. 1*a*) housed generally within the support 14. The support 14 is preferably made of electrically insulative and durable material such as pvc or other plastic material. As shown in FIGS. 1*a* and 1*b*, the insulative support 14 may have a plurality of longitudinal channels 20 therein for receiving and retaining each of the busbars 16, and secondary channels 21 for receiving flanges from a cover member as is described below.

Referring to FIG. 1*b*, the support 14 generally includes flanges 22 and 24 disposed at opposite ends thereof, and a slot 26 therebetween for securing the support in the enclosure 12 which, as shown in FIG. 1*a*, includes corresponding flanges 28, 30 and rib 32 for engaging the flanges 22, 24 and slot 26 in the support 14. A rivet 18 or other suitable fastener may also be employed to further secure support 14 within the enclosure 12 and prevent the support 14 from sliding longitudinally along the enclosure 12. Although described in conjunction with the enclosure and general layout described in the Ross '584 patent, it is to be appreciated that the improved busbar described herein could be readily employed in power distribution applications of varying size, quantity, and/or layout without varying from the scope of the present invention. Accordingly, it is to be appreciated that particular layouts shown herein are provided for example purposes only and are not intended to be limiting upon the scope of the invention. It is also to be appreciated that improved busbars in accordance with the present invention may be readily employed in both AC and DC power distribution systems.

Figure 2A:
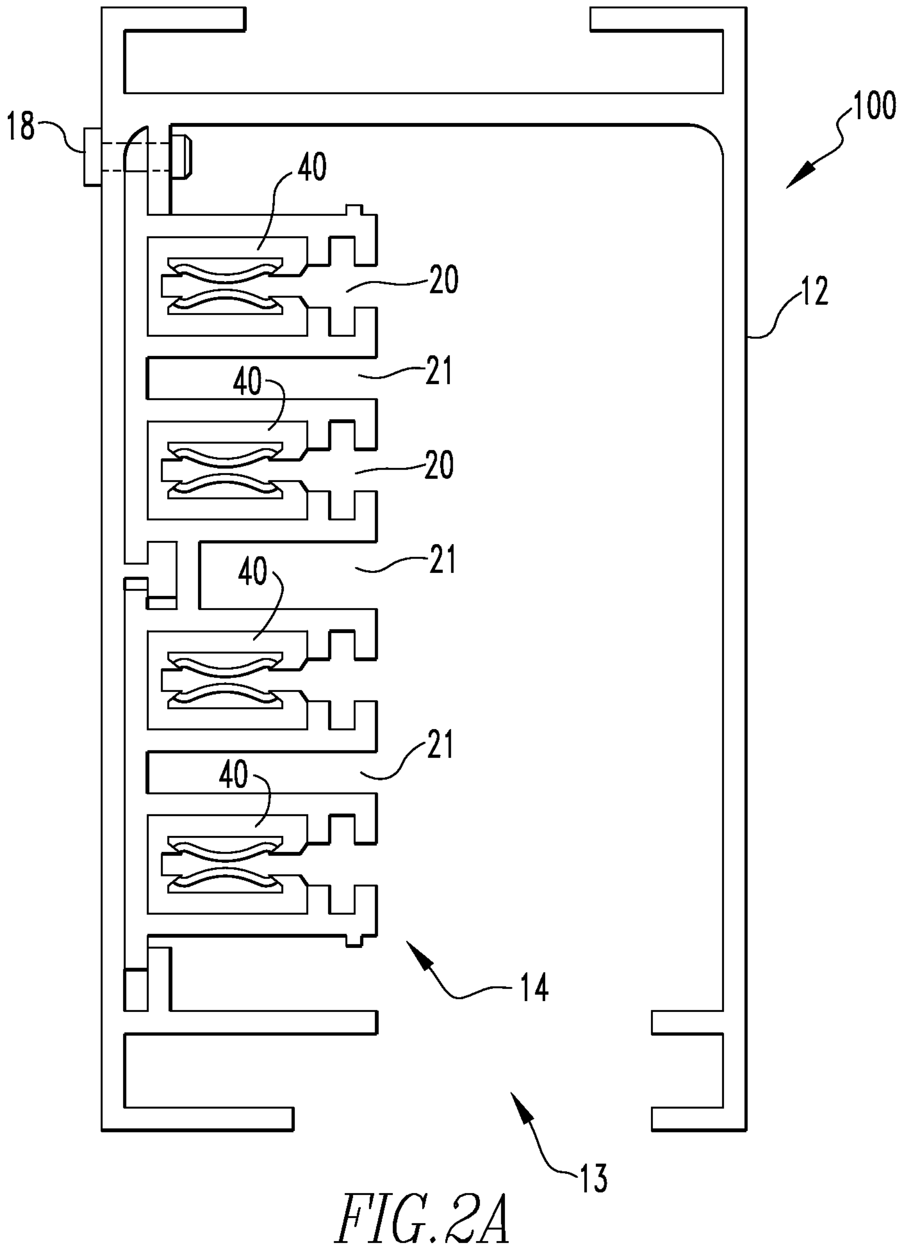
FIG. 2*a* is a cross-sectional view of an electrical power distribution track in accordance with a non-limiting embodiment of the present invention.
Figure 2C:
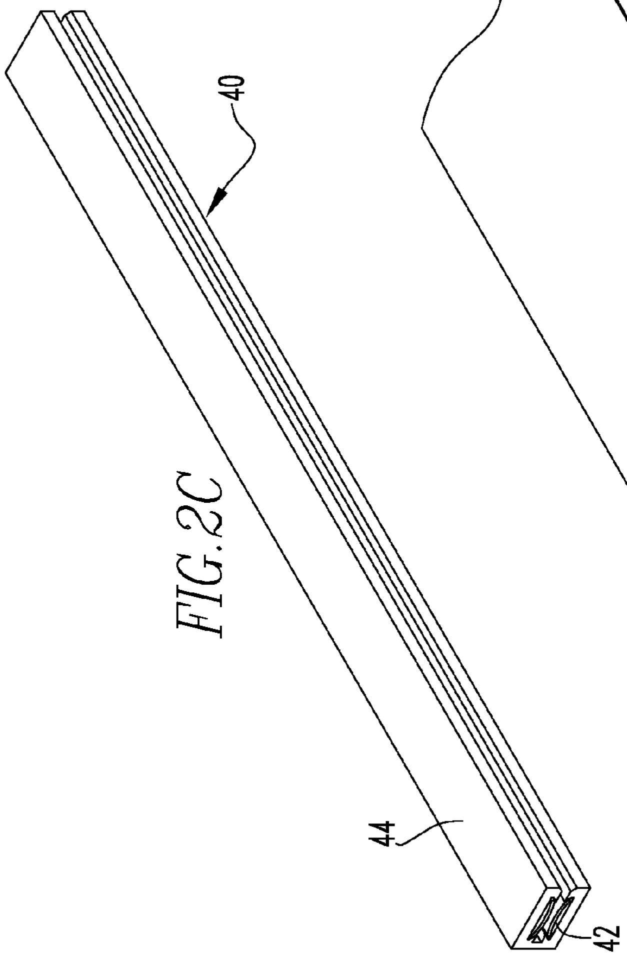
FIG. 2*c* is an isometric view of a section of the busbar of FIGS. 2*a*-2*b*.
Figure 2D:
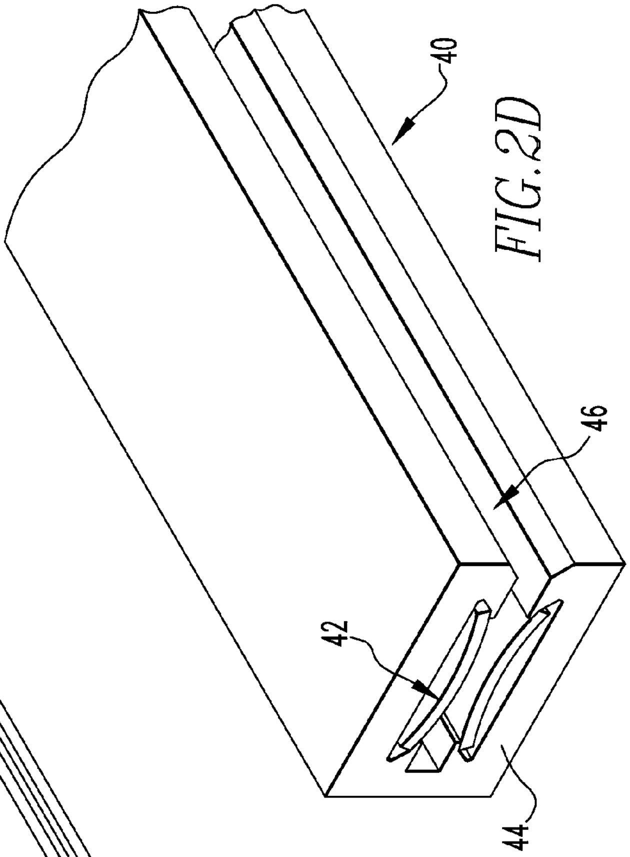
FIG. 2*d* is a detailed view of a portion of the busbar of FIG. 2*c*.

FIG. 2*a* shows a cross-sectional view of an improved electrical power distribution track 100 in accordance with a non-limiting embodiment of the present invention. Unlike the one piece busbar 16 utilized in the prior art, as previously discussed (see FIG. 1*a*), the power distribution track 100 employs a number of busbar-socket/casing-strip assemblies 40 (four are used in the embodiment of FIG. 2*a*), each assembly 40 being of a multi-piece, concentric, or 'nested' construction, as shown in greater detail in FIGS. 2*b*-2*d*, and subsequently referred to in this document as a casing-strip busbar assembly or simply busbar assembly.

In accordance with the present invention, each busbar assembly 40 in track 100 has a unique configuration that provides firm contact pressure and a large contact surface area for engaging with stabs on take-off devices that may be inserted into the track 100 at almost any point along the length of the track 100, while supplying higher current levels.

Figure 2B:
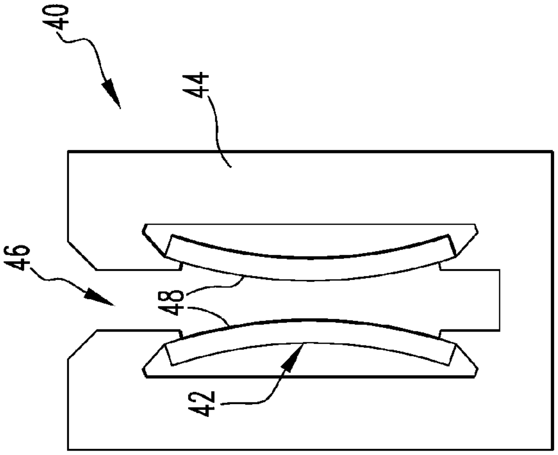
FIG. 2*b* is an end view of a busbar of the electrical power distribution track of FIG. 2*a*.
Figure 3A:
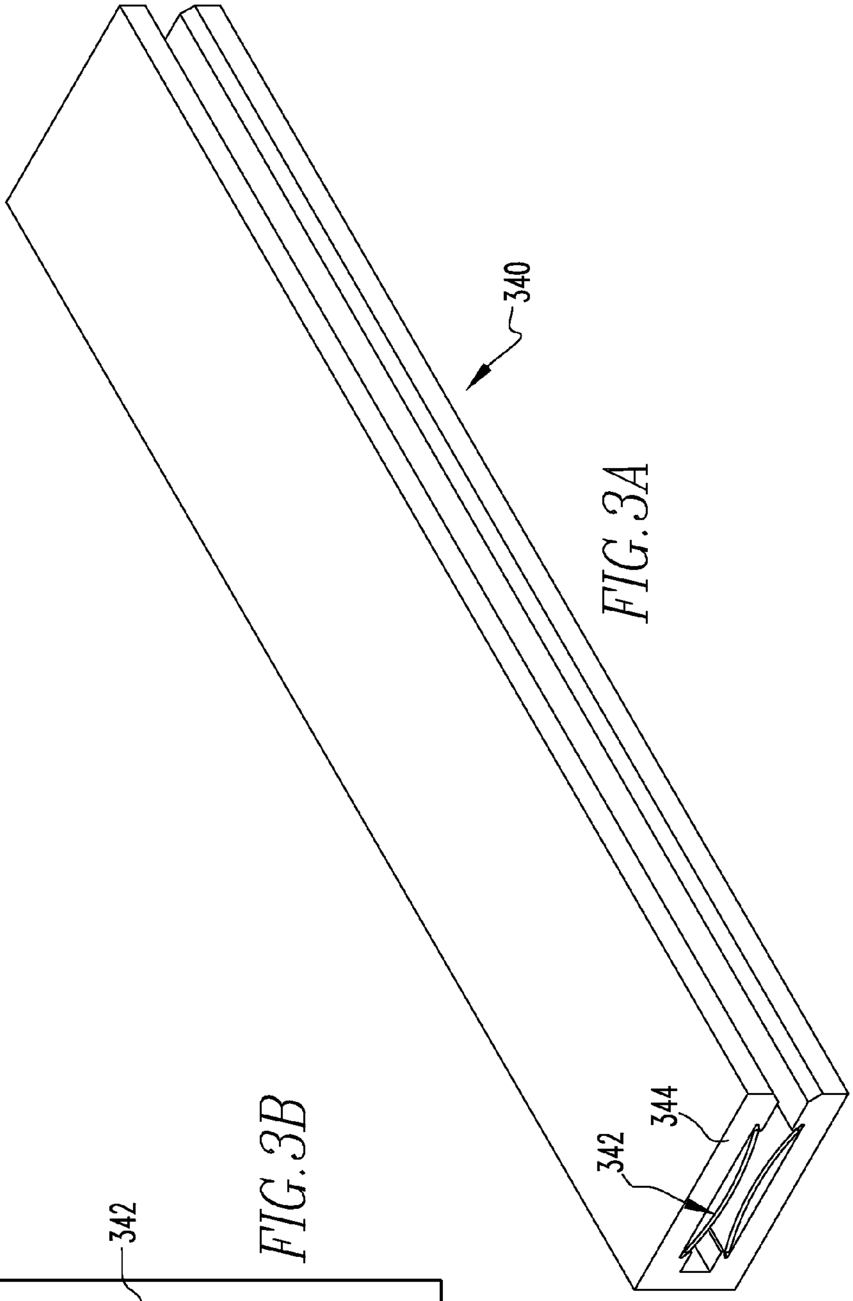
FIG. 3*a* is an isometric view of a section of busbar in accordance with another non-limiting embodiment of the invention.
Figure 3B:
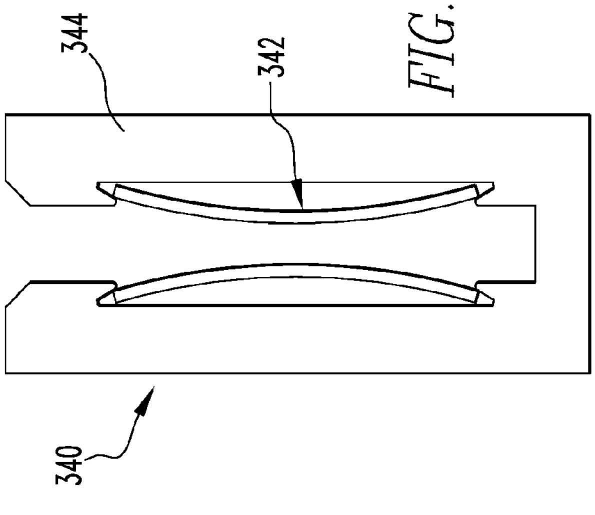
FIG. 3*b* is an end view of the section of busbar of FIG. 3*a*.
Figure 4A:
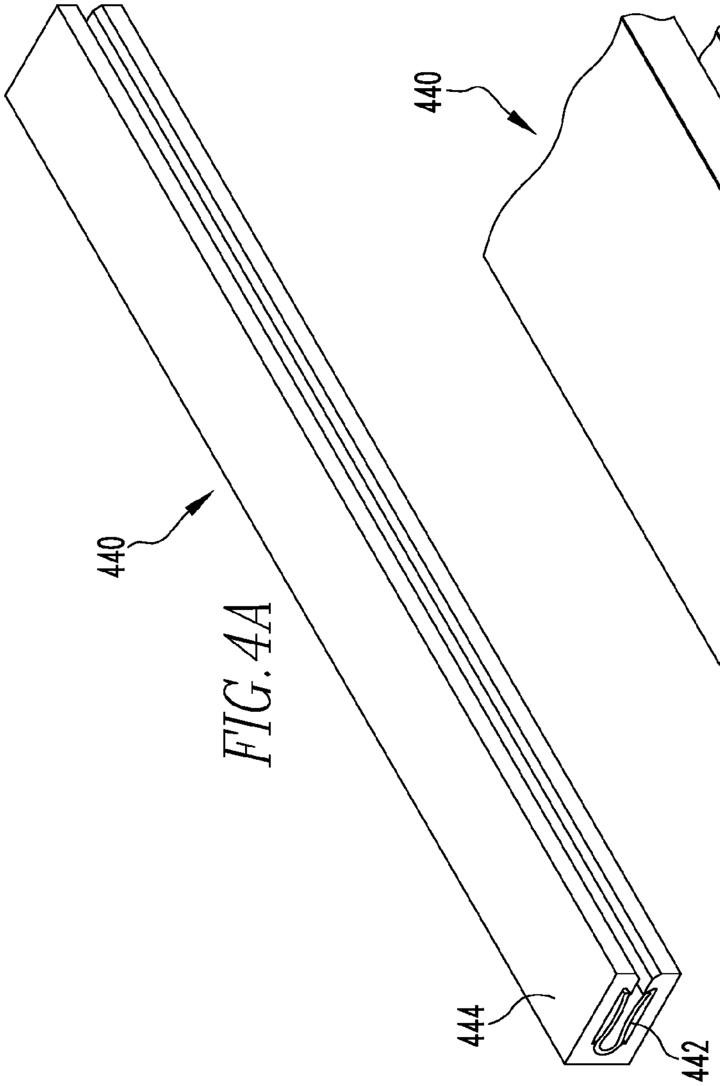
FIG. 4*a* is an isometric view of a section of busbar in accordance with a further non-limiting embodiment of the invention.
Figure 4C:
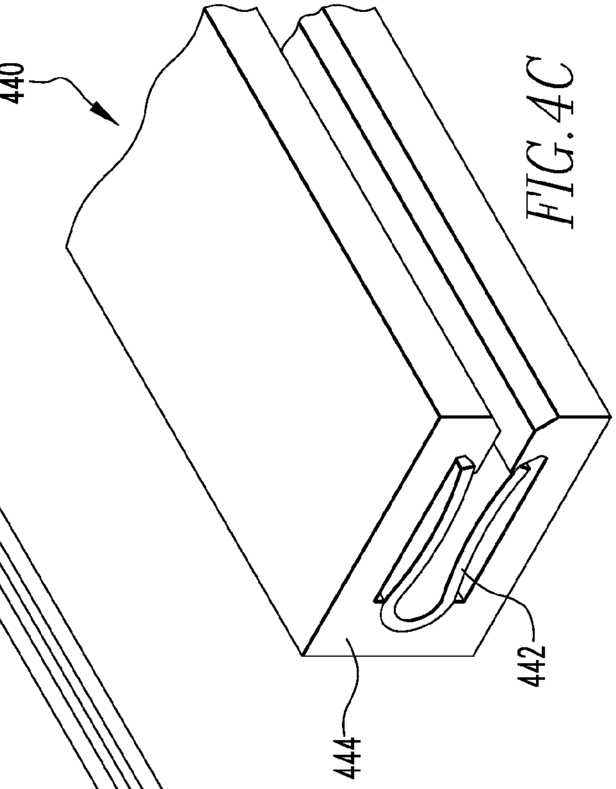
FIG. 4*c* is a detailed view of a portion of the busbar of FIG. 4*b*.
Figure 4B:
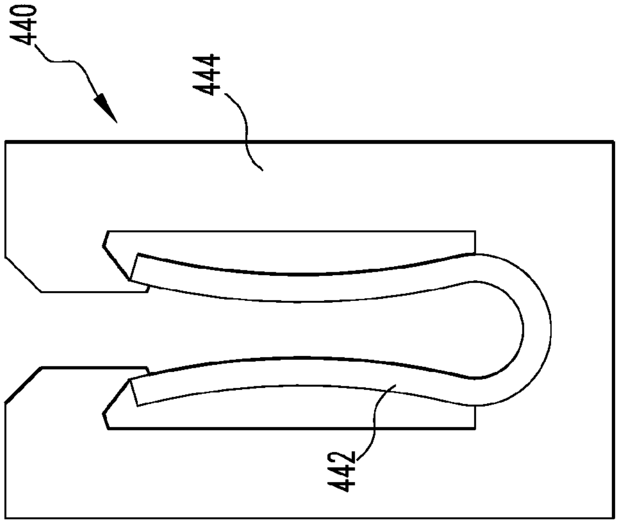
FIG. 4*b* is an end view of the section of busbar of FIG. 4*a*.
Figures 5A, 5B:
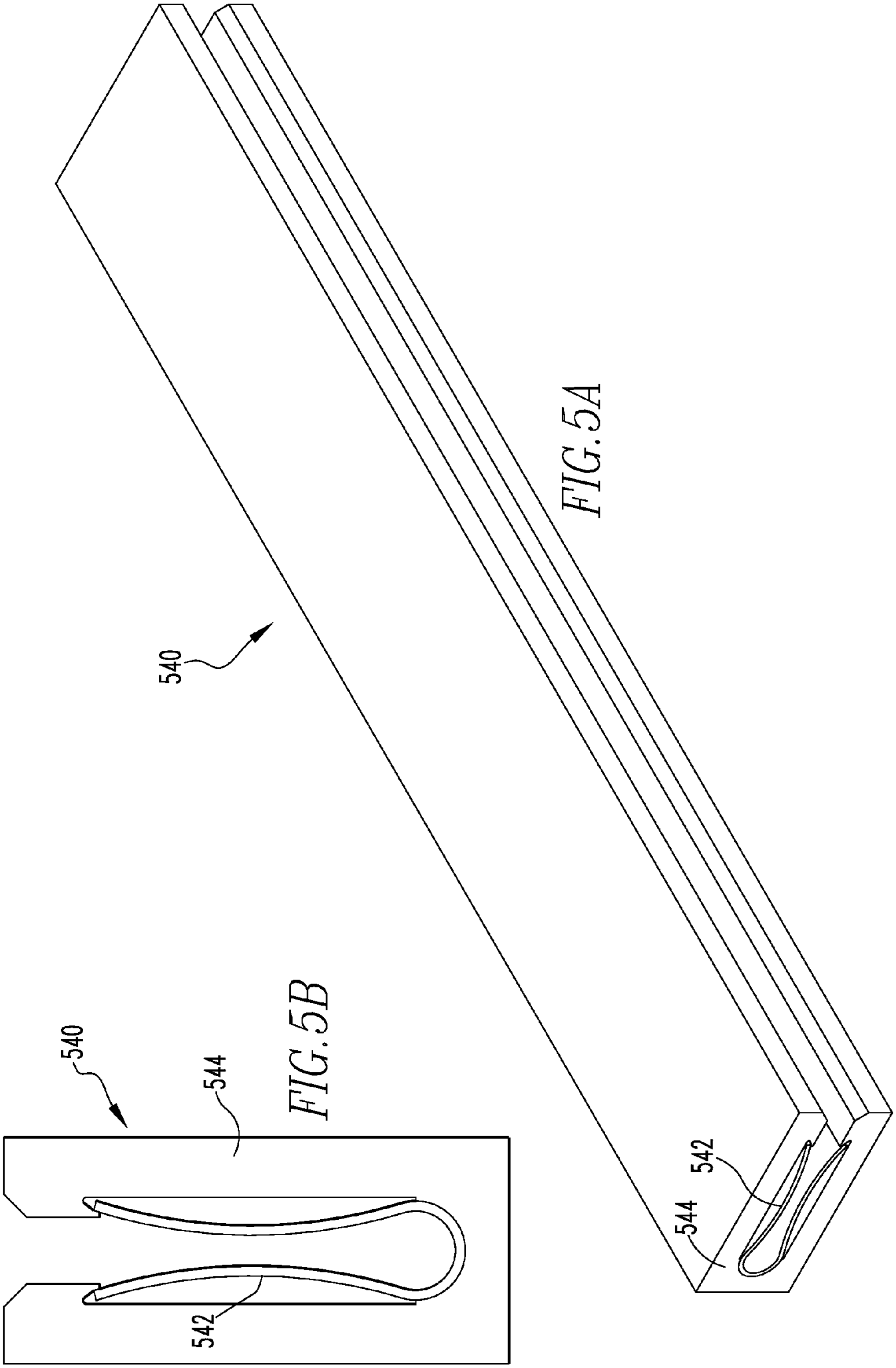
FIG. 5*a* is an isometric view of a section of busbar in accordance with yet another non-limiting embodiment of the invention.
FIG. 5*b* is an end view of the section of busbar of FIG. 5*a*.
Figure 6A:
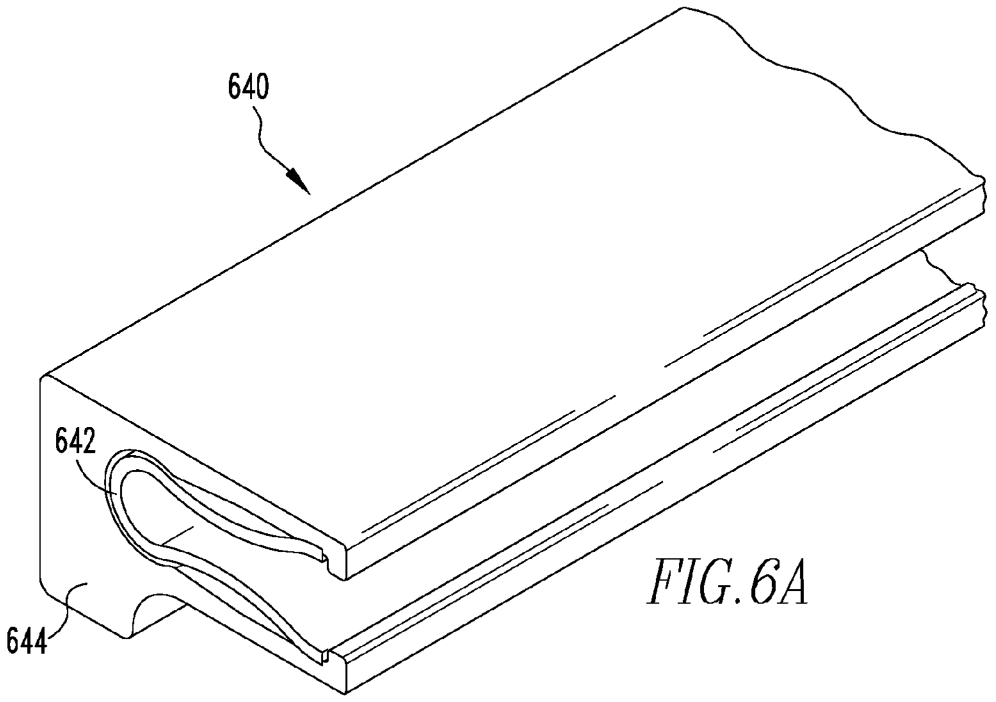
FIG. 6*a* is an isometric view of a section of busbar in accordance with a further non-limiting embodiment of the invention.
Figure 6B:
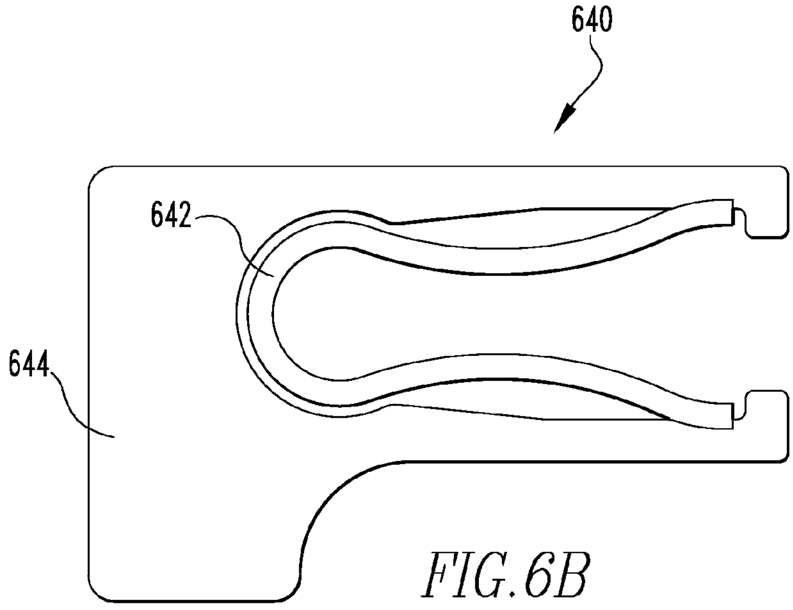
FIG. 6*b* is an end view of the section of busbar of FIG. 6*a*
Figure 7A:
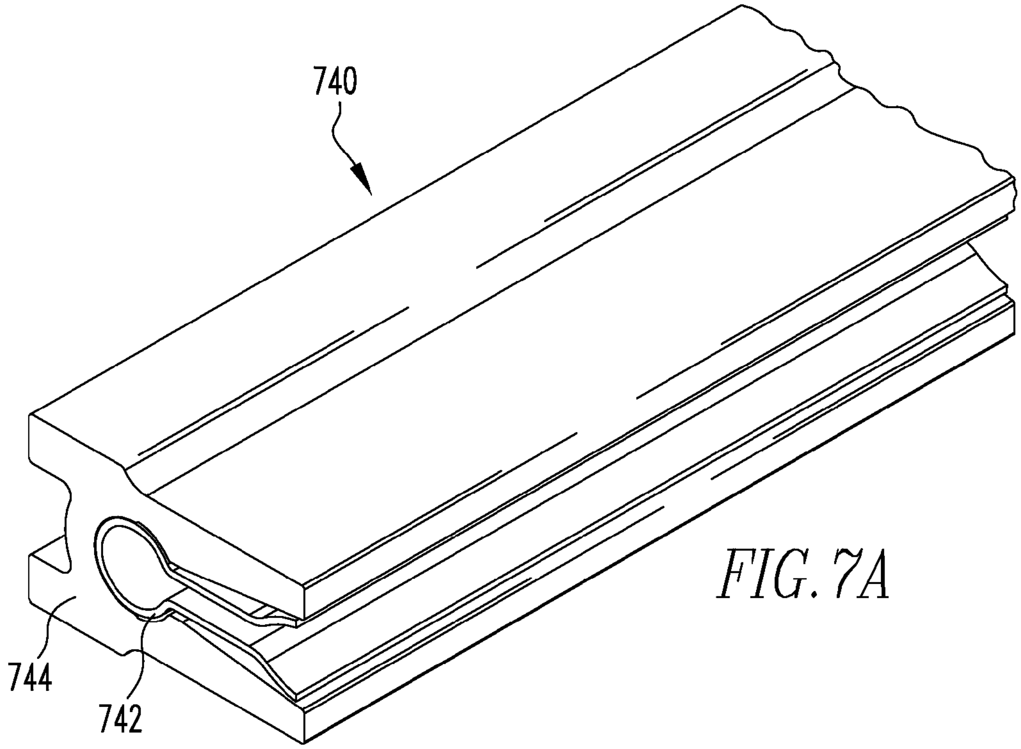
FIG. 7*a* is an isometric view of a section of busbar in accordance with a yet further non-limiting embodiment of the invention.
Figure 7B:
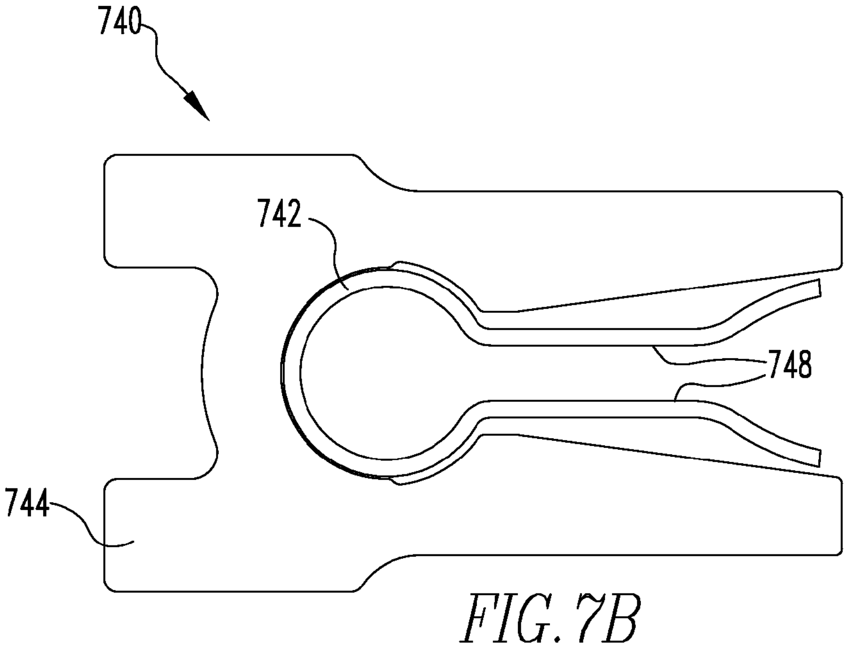
FIG. 7*b* is an end view of the section of busbar of FIG. 7*a*.

Referring to the cross-sectional view of FIG. 2*b*, busbar assembly 40 includes an inner component 42 generally surrounded by an outer component 44. Inner component 42 is preferably formed from copper or other suitable material that preferably may be tempered to be approximately half hard so as to be resilient or spring-like. Outer component 44 is preferably formed from aluminum, an alloy of aluminum, or other suitable conductive material. The multi-piece construction allows structural strength of the busbar assembly 40 to be more substantially supplied by the outer component 44 whereas flexible conductive properties of the busbar assembly 40 are more substantially supplied by the inner component 42. Such multi-piece arrangement provides for a high current carrying capacity, as both the inner and outer components 42, 44 can carry current, while minimizing the amount of inner material (preferably copper) required. Also, as an additional feature of the present invention, the respective final manufactured shapes of the inner and outer components 42,44 are designed to work together to provide minimal losses such that both components may perform their allotted functions efficiently, as will be described in further detail below.

Continuing to refer to FIG. 2*b*, the outer component 44 has a generally U-shape with a slot opening 46 through which a stab on a take-off device (not shown) would pass before engaging in a pressure contact with substantially parallel, resilient (spring-like) interior contact portions 48 of inner component 42.

Other example embodiments of busbar assemblies according to embodiments of the present invention are shown in FIGS. 3*a*-3*b*, 4*a*-4*c*, 5*a*-5*b*, 6*a*-6*b* and 7*a*-7*b*. As shown in such examples, the cross-section of the respective busbar assembly 340, 440, 540, 640 and 740 may mechanically act in a manner similar to the copper leaf spring of Ross '584, although comprised of two substantially concentric parts, the outer one preferably being made of rigid aluminum providing the mechanical, structural, cost- and weight-reduction benefits of aluminum and the inner one preferably being made of either one or two copper pieces respectively, which provide the better contact achieved in Ross '584 by the single double-loop cross section piece of copper referred to in that document as busbar 16.

The present invention is further differentiated from Ross '584 in that the new nested construction of inner component 42 and outer component 44 necessitates that the outer component 44 be machined so as to snugly accommodate the appropriate shape of the inner component 42 therein, whether the inner component 42 is a double-spring embodiment (see, e.g., without limitation, inner component 42 or 342 of FIGS. 2*a*-2*d* or 3*a*-3*b*) or a single-spring embodiment (see, e.g., without limitation, inner component 442, 542, 642, or 742 of FIGS. 4*a*-4*c*, 5*a*-5*b*, 6*a*-6*b*, or 7*a*-7*b*). Preferably, the outer component 44 snugly accommodates the inner component 42 in a manner such the inner component is captive within the outer component 44. Such snug fitting contact between the outer and inner components 44 and 42 helps to facilitate the transfer of electrical power between the components. Additionally, the transfer of electrical power between the components may also be enhanced by plating one or both of the inner and outer components with a plating such as, for example, without limitation, tin, nickel, silver or other suitable material.

In the embodiments depicted herein, each inner component 42, 342, 442, 542, 642, 742 is preferably formed from a copper strip which may be about 0.010 to about 0.125 inches thick, and is preferably in the general range of about 0.030 to about 0.050 inches thick, although other thicknesses may be employed without varying from the scope of the present invention. The preferable range of thickness of the strip from which the inner component is formed depends on which of the strip embodiments is selected, namely that depicted. It is to be appreciated that aluminum strip may also be used in place of copper for the strip in addition to the socket/casing. However, copper with its higher conductivity, is the preferred material for the strip and thus the inner component 42, 342, 442, 542, 642, 742. In general, it is desirable to provide flexibility of the material in the regions intended to grasp the stab. Accordingly, the inner component 42 must therefore not be too thick in such regions.

Figure 8A:
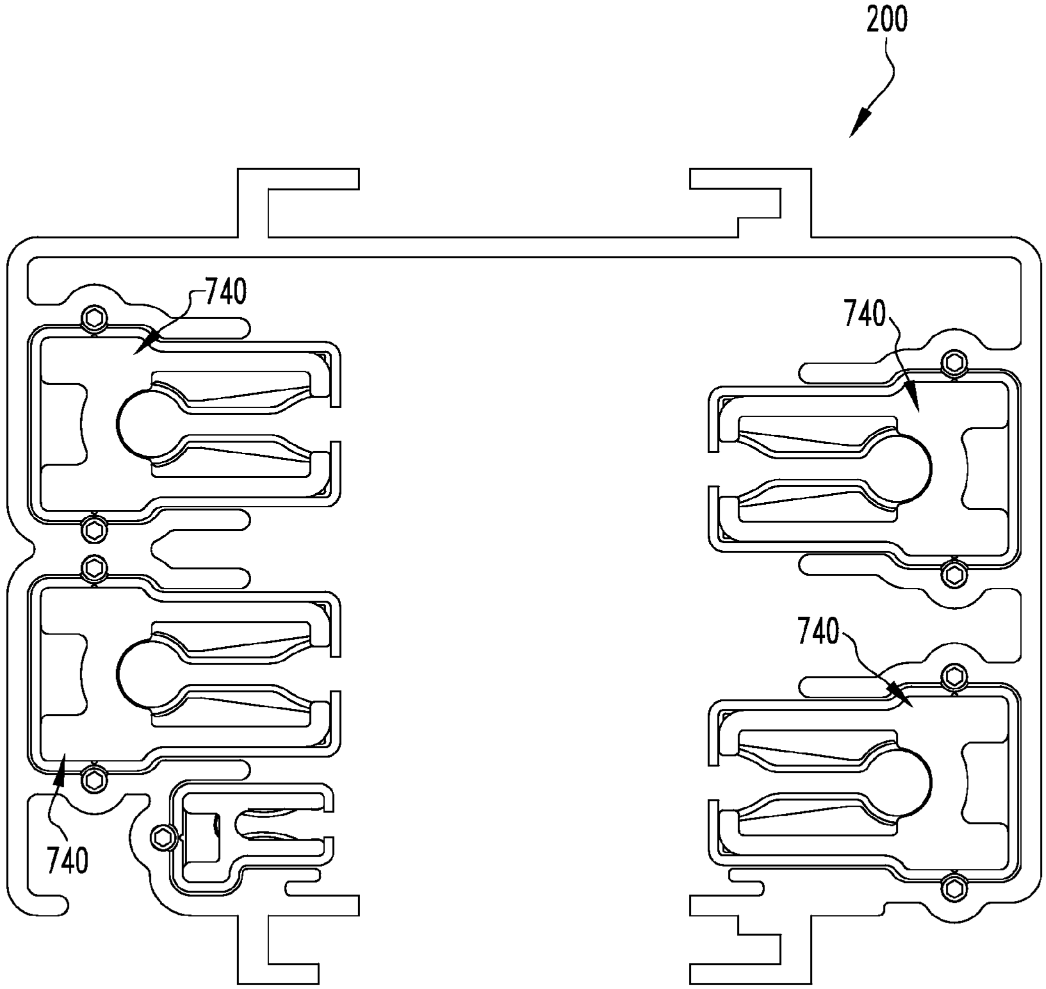
FIG. 8*a* is a cross-sectional view of an electrical power distribution track in accordance with another non-limiting embodiment of the present invention.
Figure 8B:
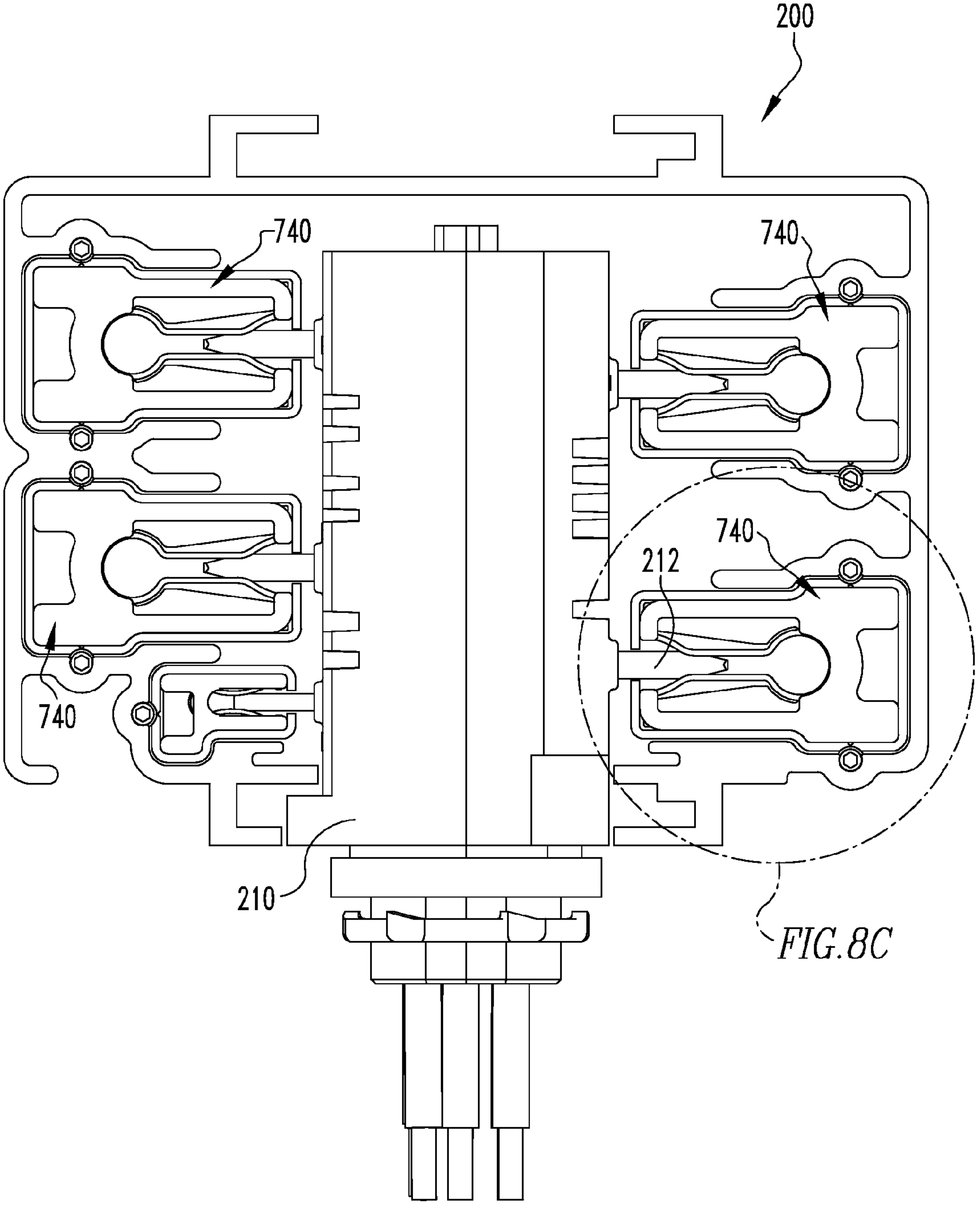
FIG. 8*b* is a cross-sectional view of the power distribution track of FIG. 8*a* with a plug-in unit installed.

FIGS. 8*a* and 8*b*, respectively, show cross-sectional views of an electrical power distribution track 200 in accordance with another non-limiting embodiment of the present invention without, and with a plug-in unit 210 installed in the power distribution track 200. As is known in the art, a plug in unit is used to connect a unit requiring power to the power distribution system. Power distribution track 200 includes a number of busbar assemblies, such as busbar assemblies 740 (see FIGS. 7*a* and 7*b*) therein that are each positioned to engage a stab 212 of plug-in unit 210. More particularly, as shown in the detail view of FIG. 8*c*, each busbar assembly 740 is positioned such that the contact portions 748 of inner component 742 are substantially parallel to each other and to the direction of stab 212. The interior contact portions 748 preferably slightly converge toward one another and leave a separation space slightly smaller than the thickness of stab 212. Due to the design of the inner component 742, the interior contact portions 748 are free to flex so as to allow the profile of the inner component 742 to conform to the stab 212 when stab 212 is inserted in busbar assembly 740. This freedom of movement is permitted by the resiliency or spring-like nature of the metal of the inner component 742 and the profile thereof.

Figure 8C:
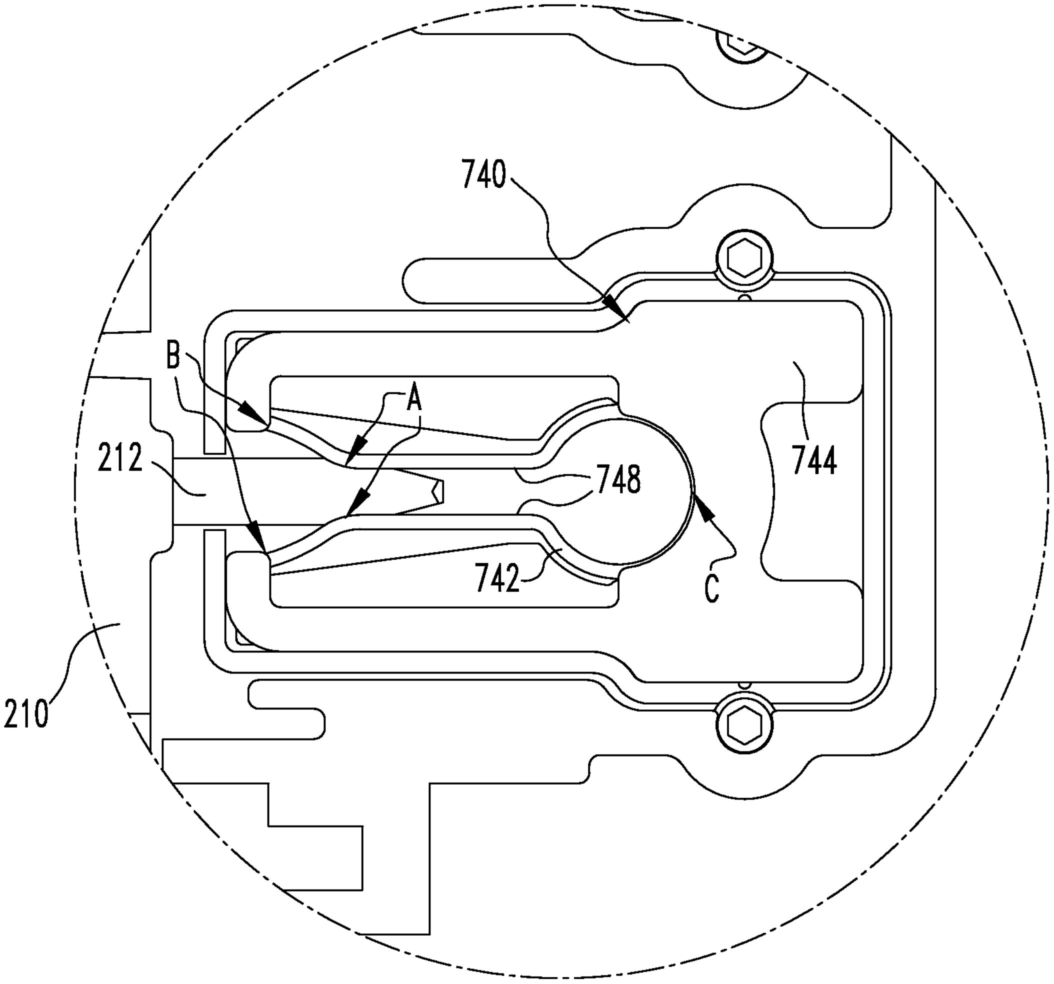
FIG. 8*c* is a detail view of a portion of the power distribution track and plug-in unit of FIG. 8*b*.

Continuing to refer to FIG. 8*c*, it is to be appreciated that the contact portions 748 remain generally parallel and pressed firmly against the stab 212, shown generally at points A, due to the flexible nature of the material and the fact that the natural spacing between the contact portions 748 is generally sized smaller than the thickness of the stab 212. It is to be appreciated that such design accommodates some variation between the slot dimension and the stab thickness and still provides good surface contact. Total contact surface area between the stab 212 and the busbar assembly 740 is generally twice the product of the height of the contact surface portion of the busbar and the width of the stab 212. In other words, both sides of the stab 212 are in full contact with contact portions 748 of the inner component 742 of busbar 740. Furthermore, inner component 742 is in contact with outer component 744 at least areas B and C of FIG. 8*c*. Current flows from the busbar 740 to the take-off device through this surface area. When the take-off device is removed from the busway, the arrangement of the inner component 742 of the busbar 740 returns to its natural shape.

It is therefore to be appreciated that the present invention provides an improved, higher-current capacity electrical power distribution system which enables insertion of take-off devices at any point along the length of the track and which provides firm contact pressure surface area and large contact between the busbars in the track and the stabs on the take-off device. The present invention also provides retainers for securing busbars in the insulative support in a busway track and provides an enhanced system for interconnecting sections of a distribution track.

The embodiments disclosed herein are provided for sole for illustrative purposes only and are not intended to be limiting upon the invention. Accordingly, it is to be understood that various changes can be made to the embodiments described or implied herein without departing from the scope of the invention or the scope of the claims appended hereto.

What is claimed is:

1. An electrical power distribution track comprising:

a housing; and a number of busbar assemblies disposed in the housing, each busbar assembly comprising:

an elongate inner component adapted to engage a plurality of stab members of a plurality of plug-in units generally at any point along the entire length thereof; and an elongate outer component disposed generally about, and in contact with, the elongate inner component, wherein the inner and outer components are formed separately and are both formed from an electrically conductive material.

2. The electrical power distribution track of claim 1 wherein the inner component is captive within the outer component.

3. The electrical power distribution track of claim 1 wherein the inner component comprises a flexible material and the outer component comprises a rigid material.

4. The electrical power distribution track of claim 3 wherein the inner component is formed from a copper material and the outer component is formed from an aluminum material.

5. The electrical power distribution track of claim 3 wherein the outer component is formed from a copper material.

6. The electrical power distribution track of claim 3 wherein the inner component is formed from a copper strip having a thickness in the range of about 0.010 to about 0.125 inches thick.

7. The electrical power distribution track of claim 3 wherein the inner component is formed from a copper strip having a thickness in the range of about 0.030 to about 0.050 inches thick.

8. The electrical power distribution track of claim 1 wherein the inner component comprises generally parallel portions adapted to engage the stab member of a plug-in unit.

9. The electrical power distribution track of claim 8 wherein the inner component is formed such that the generally parallel portions are biased toward each other when engaging the stab member of a plug-in unit.

10. The electrical power distribution track of claim 1 wherein one of the inner and outer components are plated with a plating comprising one of tin, nickel or silver.

11. A busbar assembly comprising:

an elongate inner component adapted to engage a plurality of stab members of a plurality of plug-in units generally at any point along the entire length thereof; and an elongate outer component disposed generally about, and in contact with, the elongate inner component, wherein the elongate inner and outer components are formed separately and are both formed from an electrically conductive material.

12. The busbar assembly of claim 11 wherein the inner component is captive within the outer component.

13. The busbar assembly of claim 11 wherein the inner component comprises a flexible material and the outer component comprises a rigid material.

14. The busbar assembly of claim 13 wherein the inner component is formed from a copper material and the outer component is formed from an aluminum material.

15. The busbar assembly of claim 13 wherein the outer component is formed from a copper material.

16. The busbar assembly of claim 13 wherein the inner component is formed from a copper strip having a thickness in the range of about 0.010 to about 0.125 inches thick.

17. The busbar assembly of claim 13 wherein the inner component is formed from a copper strip having a thickness in the range of about 0.030 to about 0.050 inches thick.

18. The busbar assembly of claim 11 wherein the inner component comprises generally parallel portions adapted to engage the stab member of a plug-in unit.

19. The busbar assembly of claim 18 wherein the inner component is formed such that the generally parallel portions are biased toward each other when engaging the stab member of a plug-in unit.

20. The busbar assembly of claim 11 wherein one of the inner and outer components are plated with a plating comprising one of tin, nickel or silver.

* * * * *